United States Patent [19]

Tomitaka

[11] Patent Number: 4,902,946
[45] Date of Patent: Feb. 20, 1990

[54] SOFTWARE SERVO FOR A ROTARY HEAD DRUM OF VTR

[75] Inventor: Tadafusa Tomitaka, Tokyo, Japan

[73] Assignee: Sony Corporation, Tokyo, Japan

[21] Appl. No.: 281,647

[22] Filed: Dec. 9, 1988

[30] Foreign Application Priority Data

Jan. 26, 1988 [JP] Japan .................................. 63-15559

[51] Int. Cl.⁴ .............................................. G05B 13/00
[52] U.S. Cl. ..................... 318/560; 318/615; 318/616; 318/618; 364/424.1; 360/73.06; 360/73.08
[58] Field of Search ............................... 318/601–618, 318/599; 388/800–860; 358/267, 265, 266, 273, 275; 360/73.09, 73.11, 73.12, 73.01, 73.06, 73.08

[56] References Cited

U.S. PATENT DOCUMENTS

| | | | |
|---|---|---|---|
| 3,577,056 | 4/1971 | Tsujikawa | 318/314 |
| 4,337,427 | 6/1982 | Maudal | 318/629 X |
| 4,540,923 | 9/1985 | Kade et al. | 318/631 X |
| 4,639,854 | 1/1987 | Kurokawa et al. | 318/611 X |
| 4,675,584 | 6/1987 | Kurosawa | 318/434 X |
| 4,680,518 | 7/1987 | Kurakake et al. | 318/615 X |
| 4,695,780 | 9/1987 | Kurakake et al. | 318/615 X |
| 4,718,012 | 1/1988 | Oshiage | 364/424.1 |
| 4,727,303 | 2/1988 | Morse et al. | 318/631 X |
| 4,733,149 | 3/1988 | Culberson | 388/815 X |
| 4,816,734 | 3/1989 | Kurakake et al. | 318/615 |
| 4,831,317 | 5/1989 | Sakamoto et al. | 318/599 |

Primary Examiner—William M. Shoop, Jr.
Assistant Examiner—Paul Ip
Attorney, Agent, or Firm—Lewis H. Eslinger; Jay H. Maioli; Donald S. Dowden

[57] ABSTRACT

A servo circuit controls the rotation of a drum motor to rotate a rotary head drum having a frequency generating circuit for generating a frequency signal corresponding to the revolution speed of a drum motor, a cycle detector circuit detects a cycle of the frequency signal from the frequency generating circuit, and a detector circuit speed deviation between a detected signal from the detector circuit and a reference signal to produce a first circuit generates speed deviation signal, a first circuit for generating a first circuit generates first rotation control signal based on the speed deviation signal, and a second circuit produces a second rotation control signal based on phase difference data obtained by integrating the speed deviation signal. An adder circuit adds the first and second rotation control signals to produce a rotation control signal which is supplied to the drum motor to stably rotate the rotary head drum.

8 Claims, 1 Drawing Sheet

4,902,946

SOFTWARE SERVO FOR A ROTARY HEAD DRUM OF VTR

BACKGROUND OF THE INVENTION

1. Field of the Invention

The present invention relates generally to servo circuits and more particularly to a servo circuit suitable for use in controlling a drum motor of, for example, a video tape recorder.

2. Description of the Prior Art

In a video tape recorder (VTR) in which a rotary head is mounted on a rotary head drum, a servo circuit is generally used to stabilize the running speed of a tape, i.e., a recording medium or to stabilize the revolution rate of a rotary head (see Japanese Laid-Open Patent Gazette No. 61-39877 and so on).

FIG. 1 illustrates an example of such a conventional servo circuit that controls a rotary head drum.

Referring to FIG. 1, there is shown a rotary head drum 1, and this rotary head drum 1 is rotated by a motor 2. A frequency generator 3 and a pulse generator 4 are mounted on the peripheral surface of the rotary head drum 1. The frequency generator 3 is adapted to generate a frequency signal FG of, for example, 720 Hz or to generate a signal each time the rotary head drum 1 is rotated by a predetermined angle (for example, 15°). The pulse generator 4 is adapted to generate a pulse signal of, for example, 30 Hz or to generate a pulse signal at every revolution of the rotary head drum 1.

The signal FG from the frequency generator 3 and the signal PG from the pulse generator 4 are both supplied to a servo signal processor section 5 that is represented by a phantom line in FIG. 1. This servo signal processor section 5 might be formed of an integrated circuit (IC). The signal FG supplied to the servo signal processor section 5 is supplied to a cycle detector circuit 6 therein. The cycle detector circuit 6 detects the revolution speed of the rotary head drum 1 on the basis of the signal FG and produces a voltage signal corresponding to the detected signal indicative of the revolution speed of the rotary head drum 1. The signal PG supplied to the servo signal processor section 5 is supplied to a first comparing signal input terminal of a phase difference detector circuit 7 therein. A reference signal generator 8 in the servo signal processor circuit 5 is adapted to generate a reference signal $V_D$. This reference signal $V_D$ is supplied to a second comparing signal input terminal of the phase difference detector circuit 7. When the video tape recorder is operated in the recording mode, the reference signal generator 8 receives through its terminal 9 the vertical synchronizing signal of a video signal to be recorded and generates the reference signal $V_D$ synchronized with the vertical synchronizing signal. When the video tape recorder is operated in the playback mode, a mode changing signal is supplied through a terminal 8a to the reference signal generator circuit 8 to disconnect the terminal 9 therefrom and the reference signal generator 8 itself generates the reference signal $V_D$. Then, the phase difference detector circuit 7 detects a phase difference between the pulse signal PG and the reference signal $V_D$ and produces a voltage signal corresponding to a detected phase difference therebetween.

The voltage signal from the cycle detector circuit 6 is supplied to a plus (+) input terminal of a subtracter circuit 10. Also, a voltage signal corresponding to reference speed data obtained at a terminal 11 is supplied to a minus (−) input terminal of the subtracter circuit 10. Thus, the subtracter circuit 10 subtracts the voltage signals through the terminal 11 from the voltage signal of the detector circuit 6 to produce a subtracted voltage signal that indicates a difference between the reference speed and a real speed. The subtracted signal is supplied to a first adding signal input terminal of an adder circuit 12 and the voltage signal from the phase difference detector circuit 7 is supplied to a second adding signal input terminal of the adder circuit 12. Thus, the adder circuit 12 adds the subtracted signal and the voltage signal to each other to produce an added signal of the speed difference and the phase difference. Then, the added signal from the adder circuit 12 is supplied to a phase compensator circuit 13 and is thereby phase-compensated. The output signal from the phase compensator circuit 13 is supplied to a driver circuit 14 and this driver circuit 14 drives the drum motor 2 to rotate the rotary head drum 1.

When the drum motor 2 is servo-controlled in this way, in the recording mode of the video tape recorder, the rotary head drum 1 is controlled to rotate in synchronism with the video signal to be recorded, while upon reproduction the rotary head drum 1 is controlled to rotate in synchronism with the reference signal produced within the video tape recorder.

However, if the pulse signal PG of about 30 Hz from the pulse generator 4 is used to detect the phase difference, there is then a disadvantage that the rotary head drum 1 cannot be rotated stably without a relatively lot of time.

Further, when in the playback mode the video tape recorder performs the variable tape speed reproduction such as a high-speed reproduction and so on, the revolution speed of the rotary head drum 1 has to be varied. In this case, the frequency of the reference signal $V_D$ from the reference signal generator circuit 8 has to be varied, making the reference signal generator circuit 8 complicated in arrangement.

OBJECTS AND SUMMARY OF THE INVENTION

Accordingly, it is an object of the present invention to provide an improved servo circuit.

It is another object of the present invention to provide a servo circuit which can control a drum motor to rotate stably.

It is a further object of the present invention to provide a servo circuit by which a rotation of a drum motor can be stabilized in a short time period.

It is a still further object of the present invention to provide a servo circuit which is suitable for use with a video tape recorder.

According to an aspect of the present invention, there is provided a servo circuit for controlling a rotation of a drum motor to rotate a rotary head drum comprising:
(a) means for generating a frequency signal corresponding to a revolution speed of said drum motor;
(b) means for detecting a cycle of said frequency signal from said frequency signal generating means;
(c) means for detecting a speed deviation between a detected signal from said detecting means and a reference signal to produce a speed deviation signal;
(d) means for generating a first rotation control signal based on said speed error signal;

(e) means for producing a second rotation control signal based on phase difference data which is provided by integrating said speed deviation signal; and (f) means for adding said first and second rotation control signals to produce a rotation control signal which is supplied to said drum motor.

BRIEF DESCRIPTION OF THE DRAWINGS

A better understanding of the objects, features and advantages of the invention can be gained from a consideration of the following detailed description of the preferred embodiment thereof, in conjunction with the figures of the accompanying drawings, wherein.

DETAILED DESCRIPTION OF THE PREFERRED EMBODIMENT

Now, an embodiment of a servo circuit according to the present invention will hereinafter be described with reference to FIG. 2. In FIG. 2, like parts corresponding to those of FIG. 1 are marked with the same references and therefore need not be described in detail.

Figure 1:
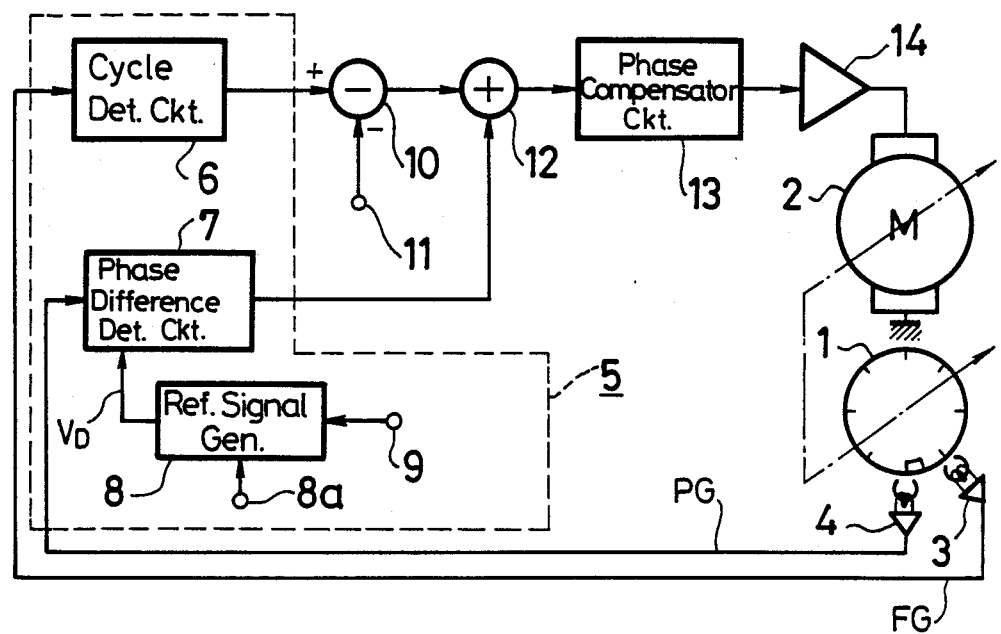
FIG. 1 is a diagram showing an example of a conventional servo circuit.
Figure 2:
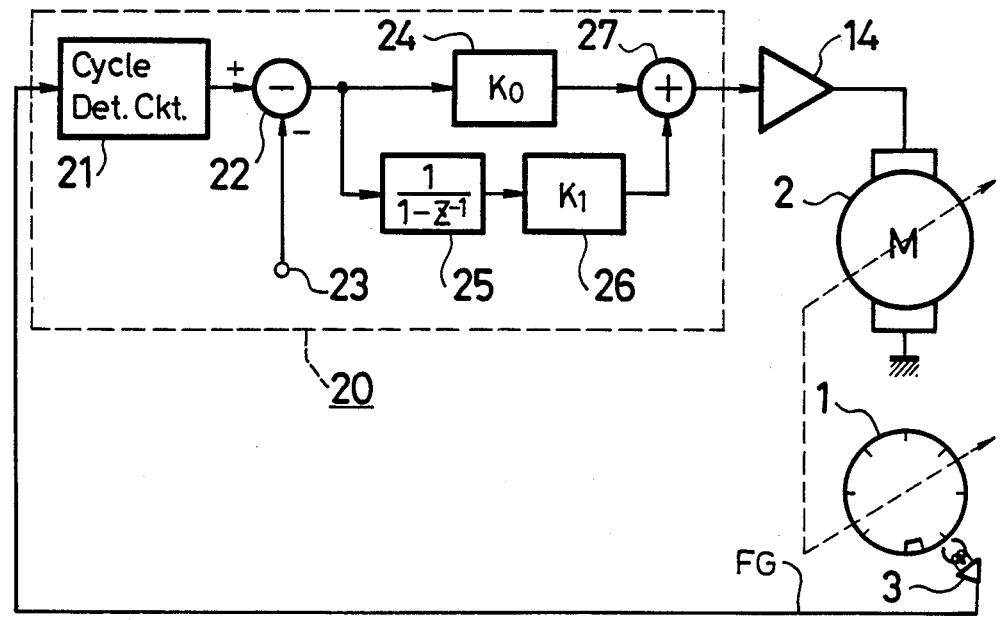
FIG. 2 is a diagram showing an embodiment of a servo circuit according to the present invention.

Similarly to FIG. 1, a servo circuit in this embodiment is adapted to control the rotation of the rotary head drum 1 on which is mounted a rotary head in a video tape recorder, so this servo circuit is used in the reproduction mode of the video tape recorder.

As FIG. 2 shows, there is provided the rotary head drum 1, and the frequency generator 3 is mounted on the peripheral surface of this rotary head drum 1 to generate the frequency signal FG. This frequency signal FG is supplied to a servo signal processor section 20 represented by a phantom in FIG. 2. The servo signal processor section 20 might be of an integrated circuit configuration. In this embodiment, the frequency generator 3 is adapted to generate the frequency signal FG which has one period or cycle every 15° rotation of the rotary head drum 1. Accordingly, if the rotary head drum 1 is rotated 30 times per second in its stable state, the frequency generator 3 produces the frequency signal FG of 720 Hz.

The signal FG supplied to the servo signal processor section 20 is supplied to a cycle detector circuit 21 therein. The cycle detector circuit 21 detects the revolution speed of the rotary head drum 1 on the basis of the frequency signal FG. The detected signal therefrom i supplied to a plus (+) input terminal of a subtracter circuit 22. A reference speed signal corresponding to a tape speed of the video tape recorder is applied through a terminal 23 to a minus (−) input terminal of the subtracter circuit 22. Thus, the subtracter circuit 22 subtracts the reference speed signal from the detected signal to produce a subtracted signal as a speed deviation signal that indicates a difference between the reference speed and the real revolution speed of the rotary head drum 1.

In this embodiment, the subtracted signal as the speed deviation signal is supplied to a first constant circuit 24. This first constant circuit 24 multiplies the speed deviation signal by $K_0$ (which is a constant) to provide a speed control signal which is supplied to a first adding signal input terminal of an adder circuit 27. Further, the subtracted signal as the speed deviation signal is supplied to an integrator circuit 25. The integrator circuit 25 integrates the speed deviation signal and converts the same into a phase information signal. In other words, the integrator circuit 25 performs the integration expressed by the $$\left(\frac{1}{1-Z^{-1}}\right).$$

The phase information signal obtained by the integration is supplied to a second constant circuit 26. The second constant circuit 26 multiplies the phase information signal by $K_1$ to produce a phase control signal where $K_1$ is a constant. The phase control signal from the second constant circuit 26 is supplied to a second adding signal input terminal of the adder circuit 27. The adder circuit 27 adds the speed control signal and the phase control signal to produce a rotation control signal. This rotation control signal from the adder circuit 27 is supplied to the driver circuit 14, and the driver circuit 14 drives the drum motor 2 to rotate the rotary head drum 1.

When the rotary head drum 1 is rotated as described above, the speed control signal and the phase control signal are obtained on the basis of the frequency signal FG having a relatively high frequency, for example, 720 Hz. Thus, the speed control signal and the phase control signal are both generated during a short interval corresponding to the frequency of 720 Hz so that the rotation of the drum motor 2 can be stabilized in a short period of time, resulting in high stability of rotation.

In the variable tape speed playback mode such as the high-speed search mode and so on, it is sufficient that the reference speed signal supplied to the terminal 23 is varied to a signal corresponding to the playback speed. By way of example, if the reference speed signal is a voltage signal, it is sufficient that the voltage value of this voltage signal is changed without need to change an oscillation frequency or the like unlike the prior art. Thus, the servo signal processor section 20 can be simplified in arrangement.

According to the servo circuit of the present invention, the rotation of the drum motor can be stabilized in a short period of time. Further, the revolution speed can be varied by the simple arrangement and the rotation of the drum motor can be controlled with high stability and with ease.

It should be understood that the above description is presented by way of example on a single preferred embodiment of the invention and it will be apparent that many modifications and variations thereof could be effected by one with ordinary skill in the art without departing from the spirit and scope of the novel concepts of the invention so that the scope of the invention should be determined only by the appended claims.

I claim as my invention:

1. Apparatus for controlling a rotation of a drum motor to rotate a rotary head drum, said apparatus comprising:

a driver circuit and a servo circuit; said servo circuit comprising:

means for generating a frequency signal corresponding to a revolution speed of said drum motor;

means responsive to said frequency signal generating means for detecting a cycle of said frequency signal from said frequency signal generating means to produce a detected signal;

means for generating a reference speed signal;

means responsive to said detecting means and said reference speed signal generating means for detecting a speed deviation between said detected signal from said detecting means and said reference speed signal to produce a speed deviation signal;

means responsive to said speed deviation signal means for generating a speed control signal based on said speed deviation signal;

means responsive to said speed deviation signal means for effecting an integration of said speed deviation signal;

means responsive to said integration means for producing a phase control signal based on said integration of said speed deviation signal; and means responsive to said speed control signal means and said phase control signal means for adding said speed control signal and said phase control signal to produce a rotation control signal;

said rotation control signal being supplied to said driver circuit and said driver circuit driving said drum motor in response to said rotation control signal.

2. A servo circuit according to claim 1, wherein said speed control signal generating means comprises a first constant circuit.

3. A servo circuit according to claim 1, wherein said phase control signal producing means includes a second constant circuit.

4. A servo circuit according to claim 2, wherein said first constant circuit multiplies said speed deviation signal by a first constant.

5. A servo circuit according to claim 3, wherein said integrator circuit produces a phase information signal supplied to said phase control signal means.

6. A servo circuit according to claim 5, wherein said second constant circuit multiplies said phase information signal by a second constant.

7. A servo circuit as claimed in claim 1, wherein said reference signal corresponds to a running speed of a tape wound around said rotary head drum.

8. A servo circuit as claimed in claim 1, wherein said driver circuit amplifies said rotation control signal.

* * * * *